United States Patent [19]

Thiele et al.

[11] Patent Number: 5,245,138

[45] Date of Patent: Sep. 14, 1993

[54] GROSS WEIGHT SCALE OF THE BEAM-FREE TYPE

[75] Inventors: Jörgen Thiele; Harry-Dieter Rasmussen, both of Lübeck; Karl H. Haase, Leipzig, all of Fed. Rep. of Germany

[73] Assignee: Greif-Werk Maschinenfabrik GmbH, Lübeck, Fed. Rep. of Germany

[21] Appl. No.: 776,637

[22] Filed: Oct. 15, 1991

[30] Foreign Application Priority Data

Oct. 15, 1990 [DE] Fed. Rep. of Germany ....... 4032653

[51] Int. Cl.$^5$ ............................................. G01G 19/00
[52] U.S. Cl. ..................................... 177/145; 177/160
[58] Field of Search ................................. 177/145, 160

[56] References Cited

U.S. PATENT DOCUMENTS 3,416,620 12/1968 McClusky ........................ 177/160 X
3,468,349 9/1969 Davis et al. ...................... 177/160 X
3,620,317 11/1971 Henry .............................. 177/160 X Primary Examiner—George H. Miller, Jr.
Attorney, Agent, or Firm—Dvorak & Traub

[57] ABSTRACT

There is disclosed, a gross weight scale for filling material which can be poured or which can flow. The filling material is weighed by means of weighing cells and is filled by way of a filling connection into a bag suspended therefrom and is then compressed. In order to keep the weighing cells free of the compressive forces and so as to be able to check between each filling of the bag, the zero points of the cells in respect of permitted weighing tolerances, the filling connection is constructed as a structural unit which is separate from the filling container and is loosely suspended by means of a hanger arrangement from the weighing cells, which are attached to the filling container, and a decoupling arrangement is provided for bringing the filling connection out of operative engagement with the hanger arrangement.

7 Claims, 2 Drawing Sheets

GROSS WEIGHT SCALE OF THE BEAM-FREE TYPE

FIELD OF THE INVENTION

This invention relates to a gross weight scale of the beam-free type for filling material which can be poured out or can flow. Such materials are herein referred to collectively as "fluent materials". Such a balance comprises a filling container for the filling material; a plurality of electromagnetic weighing cells for weighing the filling material; a filling connection following the filling container and to which a packing means, for example a bag, can be clamped for receiving the filling material; and a computer-controlled arrangement for establishing, in particular, variations in weights measured.

BACKGROUND OF THE INVENTION

In presently used scales of this type the filling container is firmly connected mechanically to the filling connection, below which is connected a weighing device having the weighing cells. The packing means to be filled with the filling material is, as a rule a so-called open bag which is clamped to the filling connection to receive the filling material. Although such balances are of compact construction, they have no means for compressing the filling material in the bag, since such scales can only be used with filling materials which do not need to be compressed, or should not be compressed. Such scales therefore, have only a limited range of use. Also, the weighing accuracy of such scales cannot be rapidly and simply checked.

SUMMARY OF THE INVENTION

The present invention is intended to provide a gross weight scale of the type described above, which is of compact construction and allows of compressing the packed filling material in the packing means whilst it is still hanging from the filling connection, without risk of damage to the weighing cells, the weighing accuracy of the scale being checkable, quickly and simply.

According to the present invention the filling connection is constructed as a structural unit which is separate from the filling container and is loosely suspended by means of a hanger arrangement on the weighing cells which are attached to the filling container. A decoupling arrangement is provided which brings the filling connection out of operative engagement with the hanger arrangement and a compressing arrangement for the packed filling material is arranged after the filling connection.

By virtue of the present invention, the gross weight balance is operative as a gross weight packing scale. The scale is of simple and compact construction, and the weighing cells are protected during the packing process, that is to say the compression of the filling material, because the weighing cells are not then exposed to the stresses arising from the compressing process; by virtue of the mechanical decoupling of the filling connection from the weighing cells. To this end, the filling connection is lifted, so that after the packing means has been filled, the weighing cells are completely relieved, and the filling material can then be compressed in the packing means. Further, after each filling operation the calibration of the scale can be checked both quickly and simply, in order to establish whether, for example, any variation in the measured weight of the quantity of filling material that has been packed remains within the permitted tolerance.

Although so-called net weight packing scales having compressing means for the packed filling material are known and in such scales there is no risk of damage to the weighing cells these scales are of both cumbersome and bulky construction, and so take up an undesirably large amount of space.

In order to provide for a simple construction thereof the uncoupling arrangement may comprise at least two units, each having a decoupling rod and a drive means for moving the rod upwards and downwards, each decoupling rod having at its lower end a carrier element for the filling connection, the drive means receiving, and being drivingly connected to, the upper end portion of the decoupling rod, and being mounted on the filling container. In order to achieve a simple construction for the hanger arrangement it may consist of several hanger units, each associated with a weighing cell, each unit having a supporting rod provided with a supporting body at its lower end, and having its upper end attached to the associated weighing cell, the filling connection resting on the supporting body so as to hang loosely.

A preferably annular calibration weight, the weight of which corresponds to the required quantity of filling material, may rest loosely on the hanger arrangement above the filling connection, whereby the calibration weight is economical of space.

In order to establish the original zero point of the weighing cells, the supporting rod of each hanger unit may have a further supporting body for loosely supporting and lifting the calibration weight, the further supporting body being spaced above the first mentioned supporting body on the supporting rod.

DETAILED DESCRIPTION OF THE PREFERRED EMBODIMENT OF THE INVENTION

Figure 1:
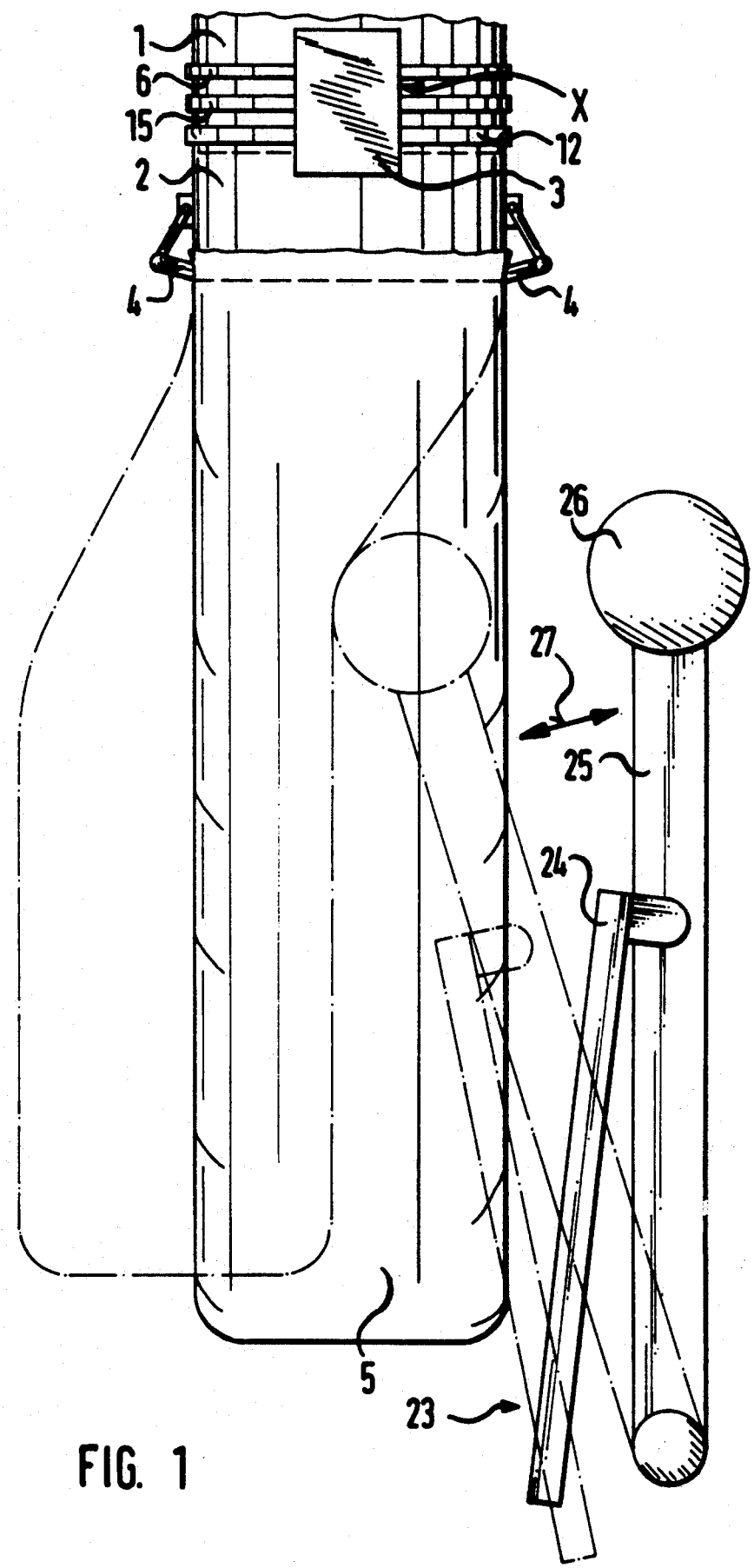
FIG. 1 is a side view of a beamless, dosing, gross weight, packing scale according to the preferred embodiment of the invention, with parts omitted.

FIG. 1 shows only those parts of the dosing gross weight, packing scale which are necessary for a proper understanding of the preferred embodiment of the invention. Accordingly, therefore, dosing apparatus, including a stand of the balance and a computer-supported arrangement for the evaluation of values measured are not shown in the drawings. A filling container 1, fed from the dosing apparatus, is shown partially in FIG. 1. The filling container 1 is succeeded by a filling connection 2 arranged as a structural unit which is separate from the container and is connected thereto solely by way of mechanisms generally referenced 3, one of which is indicated in FIG. 1 by a blank rectangle X. A mechanism 3 is hereinafter described in detail with particular reference to FIGS. 2 to 4. The lower end of the filling connection 2 is equipped in conventional manner with a clamping arrangement 4, for temporarily securing to the connection 2 an open bag 5 which is to be filled with a predetermined quantity of filling material (not shown) which can be poured or which can flow. As stated above such materials are herein referred to collectively as fluent materials. Depending upon the sizes of the filling container 1 and the filling connection 2, at least two mechanisms 3 are provided.

Figure 3:
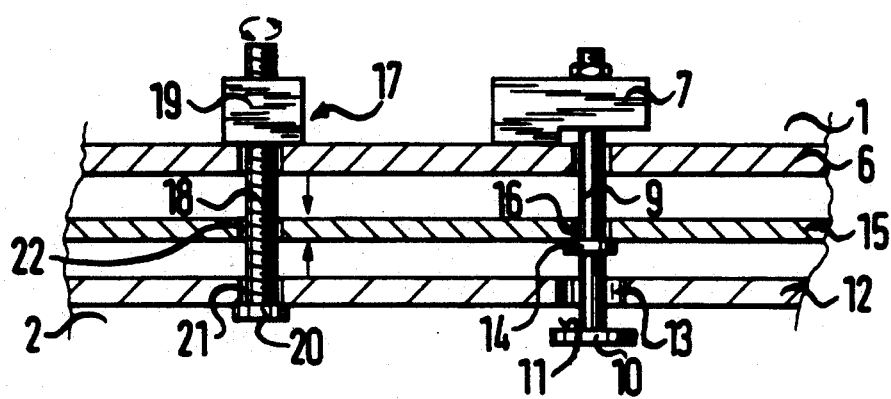
Figure 4:
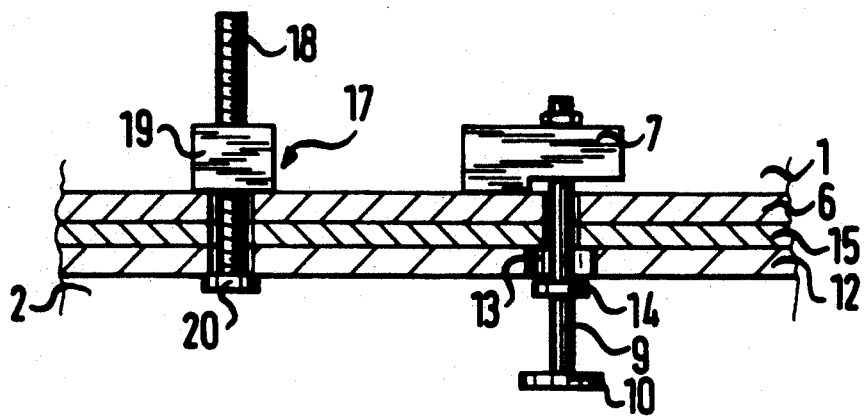

The construction of a mechanism 3 will now be described in detail with particular reference to FIGS. 2 to 4.

The filling container 1 has at its lower end an annular flange 6, which in accordance with the number of the mechanisms 3 is provided with the same number of electromagnetic weighing cells 7. The weighing cells 7 are a type of strain gauge cells and are known in the art. The filling connection 2 is connected to the weighting cells 7 by means of a hanger arrangement generally referenced 8. Each weighing cell 7 has associated therewith a hanger unit comprising a supporting rod 9, which is mechanically connected at its upper end to the weighing cell 7, and has at its lower end a supporting plate 10, the upper face of which provides a supporting shoulder 11, on which an annular flange 12 of the filling connection 2 rests loosely. The flange 12, which is formed with holes 13 through each of which the respective supporting rod 9 extends. The margin of the annular flange 12, adjoining the holes 13, lies loosely on the shoulder 11 of the plate 10, the filling connection 2 thereby resting loosely on the shoulder 11.

There is attached to the rod 9 a supporting body 14 spaced axially from the supporting plate 10, above the filling connection 2. An interchangeable, annular, calibration weight 15 resting loosely on the body 14 is of a weight corresponding to the quantity of filling material with which the bag 5 is to be filled in each case. In the present example the calibration weight 15 is provided with holes 16, through which the respective supporting rods 9 extend. The holes 13 in the flange 12 of the filling connection 2 are of such a diameter as to enable the supporting bodies 14 to move through the holes 13, when the filling connection 2 is lifted upwards, for reasons explained below. The weight 15 is preferably constructed as a ring surrounding the lower end of the filling container 1. Said lower end projects, free of contact therewith, into the upper end of the filling connection 2, as will be apparent from FIG. 1.

Each mechanism 3 also comprises, in the present example, a decoupling arrangement 17, for completely relieving the weighing cells 7 from the weight of the filling connection 2 with the bag 5 suspended therefrom. Each arrangement 17 consists of a decoupling rod 18, for example a threaded rod, and a drive means 19, which may be a geared electric servo-motor, for moving the rod 18 upwards and downwards, in order to lift the filling connection 2 together with the bag 5 suspended therefrom, thereby to relieve the weighing cells 7. To this end, each rod 18 has at its lower end a carrier element 20 for engaging behind the flange 12 of the filling connection 2, the rod 18 extending through a hole 21 in the flange 12. The rod 18 also extends through a hole 22 in the calibration weight 15. It is to be noted, however, that instead of the holes 22 the calibration weight 15 may be otherwise constructed in order to bypass the rod 18. The hole 21 in the flange 12, may similarly be omitted, other means being provided to enable the flange 12 and thus the filling connection 2 to be lifted.

If, in accordance with the size of the gross weight balance more than two electromagnetic weighing cells 7 are mounted circumferentially on the flange 6 of the filling container 1 so that more than two hanger arrangements 8 are provided, only two decoupling arrangements 17 may need to be provided in order to ensure that the filling connection 2 can be lifted uniformly together with the bag 5.

A compressing arrangement 23 is arranged below the filling connection 2, for cooperation with the open bag 5 suspended from the connection 2. The arrangement 23, which is shown diagrammatically in side view in FIG. 1, is a so-called taper roll packer of known construction and will, therefore, only be described briefly. The arrangement 23 has a surface body 24, and two taper rolls 26 attached to the top of a frame 25. The body 24 may also be connected to the frame 25. The compressing arrangements 23 can be driven as indicated by the double arrow 27 in FIG. 1, in order to compress the bags, as indicated in broken lines in FIG. 1. Some other conventional compressing arrangement may be substituted for the arrangement 23.

The operation of the dosing, gross weight, packing scale, described above, will now be explained.

Figure 2:
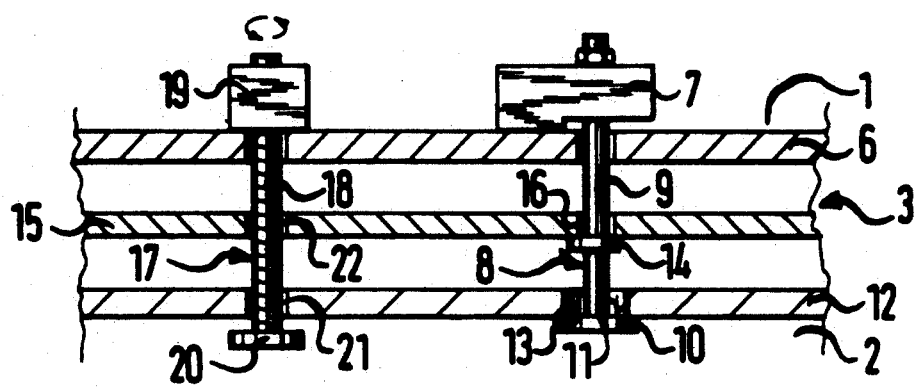
FIGS. 2, 3 and 4 are side views shown partly in section of mechanism in the blank rectangle X in FIG. 1, FIGS. 2, 3 and 4 showing said mechanism in respective different states of operation.

Before a quantity of filling material is dosed into the bag 5, suspended from the filling connection 2, under compression, each mechanism 3 is in the state of operation shown in FIG. 2. The filling connection 2, by way of its flange 12, rests on the supporting plate 10, the carrier element 20 being out of engagement with the annular flange 12, so that the tare weight, which consists of the filling connection 2 and the bag 5 suspended therefrom, fully loads the weighing cells 7 by way of the supporting plates 10 and the supporting rods 9. The bag 5 is then filled with a dose of the filling material through the filling container 1 and the filling connection 2. Such dosage is effected in a conventional manner with coarse flow regulation, and subsequent fine flow regulation, of filling material, in balance with the calibration weight 15. Since means for carrying out such flow regulation are not relevant to the present invention they will not be described herein.

When the desired quantity of filling material has been fed into the open bag 5, the compressing arrangement 23 is actuated in a conventional manner to compress the filled bag 5 as indicated in broken lines in FIG. 1. Before compression of the bag 5 begins, the drive means 19 of each mechanism 3 is actuated so that the decoupling rod 18 thereof rises and thereby lifts the filling connection 2 by way of its flange 12, by means of the carrier element 20, so that the supporting plate 10 is disengaged from the flange 12, so that each weighing cell 7 is partly relieved, as will be apparent from FIG. 3. The compressing operation can, therefore, take place without the stresses acting on the filling connection 2 through the compressing arrangement 23 being transferred to the weighing cells 7, since these are fully decoupled from the filling connection 2.

When the compressing operation has been completed, the bag 5 is removed from the filling connection 2 and a new bag is clamped thereto by means of the clamping arrangement 4. By means of said computer-supported arrangement, it can be checked whether the tare weight already set is in the permitted tolerance range or is not within said range and must, therefore, be reset, the actual tare weight, that is to say the weight of the connection 2 and the bag 5, being measured by the weighing cells 7, as will be apparent from FIG. 2.

At this time, the original zero point of the weighing cells 7 may also be checked. As will be apparent from FIG. 4, after further actuation of the drive means 19, the rods 18 are further raised, so that not only is the filling connection 2 further raised, but the calibration weight 15 is also raised, so that the weighing cells 7 are fully relieved of the weight of the calibration weight 15. As shown in FIG. 4, the flange 12 of the filling connection 2 is raised to the extent that the supporting body 14, upon which the calibration weight 15 normally rests, is moved through the hole 13 of the flange 12 so as to lie therebeneath. The weighing cells 7 are, therefore, exposed to no further stress, so that their zero point can be established in connection with the computer-supported arrangement, in order to establish, in particular, weight variations, so that said zero point can if necessary be reset.

Each drive means 19 is then actuated again in the reverse direction, so that the filling connection 2 and if necessary also the calibration weight 15 fall to the starting position shown in FIG. 2. Thereafter the bag 5 can again be filled and the filling material compressed.

It will be apparent from the above description that the weighing cells 7 are protected during compression of the filling material and that the zero points and transfer factors can simply and readily be checked. The compressing arrangement may be omitted. Even so the decoupling arrangement enables rapid and simple checking of the weighing accuracy of the gross weight balance.

What is claimed is:

1. A gross weight scale for filling a packing means with fluent filling material, said scale comprising:
   a filling container for the filling material;
   a plurality of electromagnetic weighing cells for weighing the filling material;
   a filling connection following the filling container;
   means for clamping the packing means to the filling connection to receive filling material from the filling container by way of the filling connection; and
   computer-supported means for evaluating weight values measured; wherein
   said weighing cells are attached to the filling connection and the filling connection is constructed as a unit which is separate from the filling container;
   said gross weight scale further comprising:
   a hanger arrangement on the weighing cells loosely suspending the filling connection therefrom;
   a decoupling arrangement for bringing the filling connection out of operative engagement with the hanger arrangement; and
   means following the filling connection for compressing filling material in the packing means.

2. A scale as claimed in claim 1, wherein the decoupling arrangement comprises at least two units each having a decoupling rod and drive means for raising and lowering said rod, each decoupling rod having at a lower end thereof a carrier element for supporting the filling connection, each drive means being mounted on the filling container and drivingly receiving an upper end of the respective decoupling rod.

3. A scale as claimed in claim 1, wherein the hanger arrangement comprises a plurality of hanger units each associated with a weighing cell and each comprising a supporting rod having an upper end connected to the associated weighing cell and a lower end provided with a supporting body upon which said loosely suspended filling container rests.

4. A scale as claimed in claim 3, wherein each supporting rod has a further supporting body spaced from the first mentioned supporting body axially upwardly of the supporting rod, for loosely supporting and lifting an annular calibration weight.

5. A scale as claimed in claim 1, further comprising a calibration weight corresponding in weight to the quantity of filling material with which said packing means is to be filled, the calibration weight resting loosely on the hanger arrangement above the filling connection.

6. A scale as claimed in claim 5, wherein the calibration weight is annular.

7. A gross weight scale for filling a packing means with fluent filling material, said scale comprising:
   a filling container for the filling material;
   a plurality of electromagnetic weighing cells for weighing the filling material;
   a filling connection following the filling container;
   means for clamping the packing means to the filling connection to receive filling material from the filling container by way of the filling connection; and
   computer-supported means for evaluating weight values measured; wherein
   the weighing cells are attached to the filling container and the filling connection is constructed as a unit which is separate from the filling container,
   the gross weight scale further comprising:
   a hanger arrangement loosely suspending the filling connection from the weighing cells; and
   a decoupling arrangement for bringing the filling connection out of operative engagement with the hanger arrangement.

* * * * *